Dec. 5, 1961  A. HESS  3,011,766
WIPER TYPE SEAL FOR ROTARY REGENERATOR
Filed Aug. 29, 1958  2 Sheets-Sheet 1
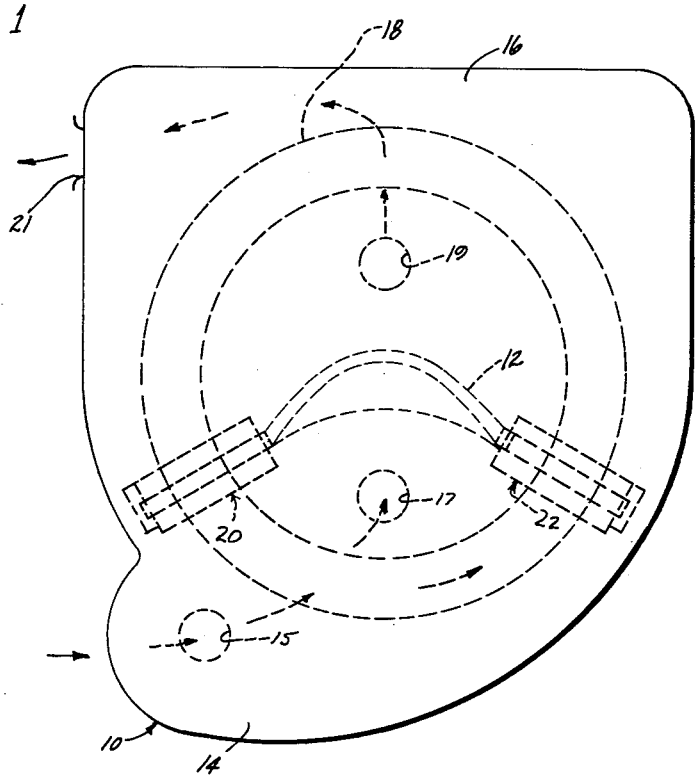
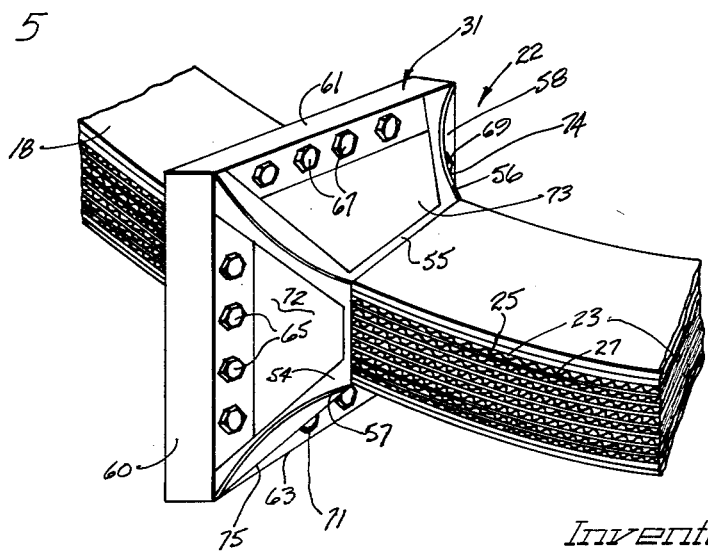
Inventor
ANTON HESS

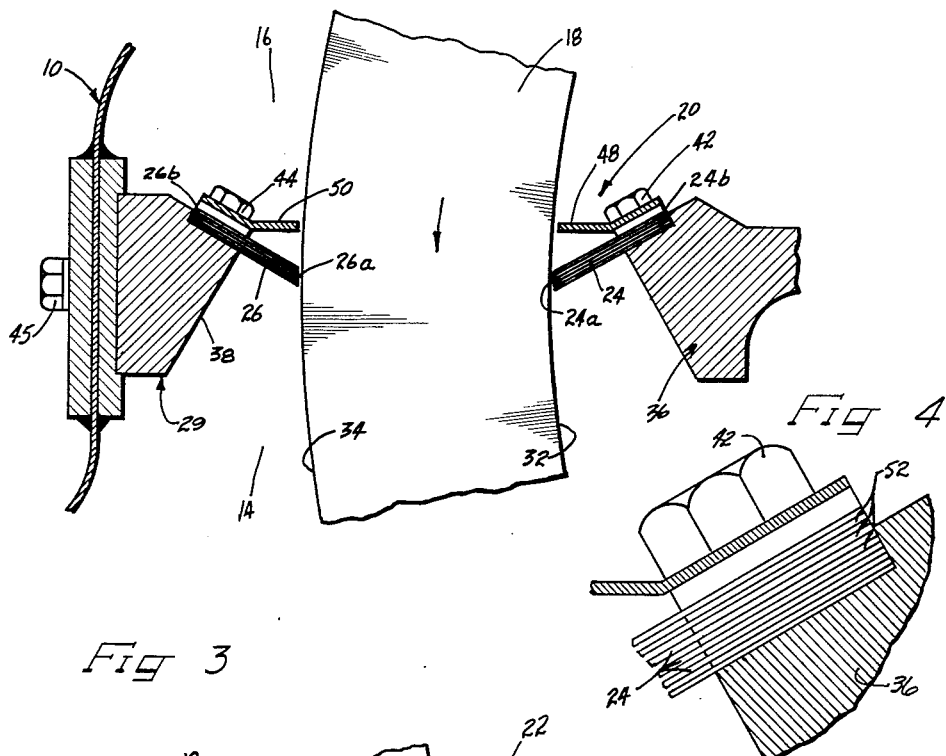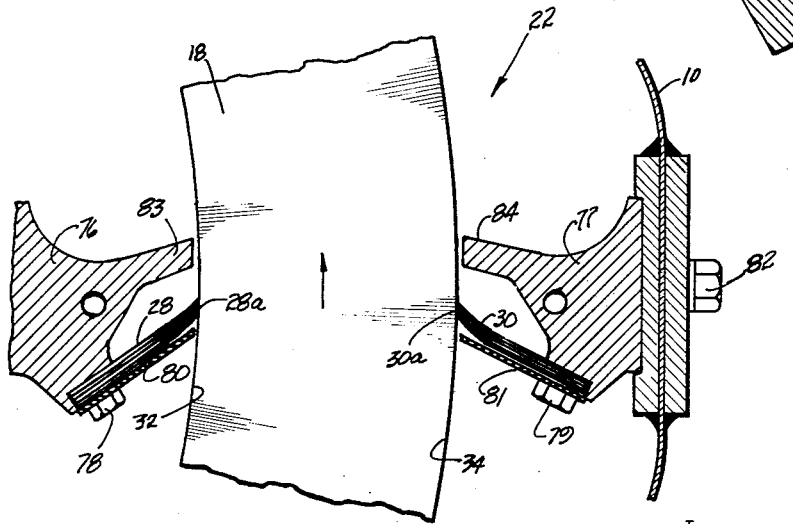

United States Patent Office 3,011,766
Patented Dec. 5, 1961

3,011,766
WIPER TYPE SEAL FOR ROTARY REGENERATOR
Anton Hess, Parma, Ohio, assignor to Thompson Ramo Wooldridge Inc., a corporation of Ohio
Filed Aug. 29, 1958, Ser. No. 758,001
4 Claims. (Cl. 257—269)

The present invention relates to improvements in rotary regenerators such as used with gas turbines and more particularly to a regenerator having a rotating drum matrix with an improved seal to prevent the flow of air from a high pressure low temperature air chamber of the regenerator housing to a high temperature low pressure gas chamber as the regenerator rotates through a housing partition between said chambers.

The invention contemplates the provision of an improved seal to separate two gas chambers each of which are subjected to different pressure and temperature conditions. In a rotary regenerator of the type contemplated for use with a turbine, a rotary annular matrix drum has passages which become heated with the flow of hot exhaust gas, and then heat a flow of air which is subsequently directed through the passages. Thus exhaust gas from the turbine is used to heat compressed air from the compressor delivered to the combustor. The matrix drum must be free to rotate and pass through both chambers rotating at some low optimum speed to satisfy the thermodynamics of the system. In rotating, the drum dynamics pose severe sealing problems which must be solved if the regenerator effectiveness is to be great enough to warrant extended use of the gas turbines in the low pressure ratio range. A seal to prevent the escape of gas past the surface of the rotating matrix drum must be flexible and offer the matrix drum freedom of rotation and yet prevent the escape of air from the high pressure air chamber with a consequent loss of energy and efficiency.

A feature of the invention is a provision of a seal employing highly flexible sealing leaves constructed and supported to maintain sealing engagement with the rotating matrix drum surface during operation of the regenerator. The feature achieves improved design characteristics and the flexibility of the seal permits freedom of rotation of the regenerator drum and accommodates dimensional and alignment changes with drastic temperature change, and controls contact force between the seal and the drum.

Accordingly, it is an object of the present invention to provide an improved seal to prevent the escape of air between chambers in a rotary regenerator and which will offer a more effective and efficient seal.

Another object of the invention is to provide an improved seal for a rotary regenerator which accommodates dimensional changes and distortions with the occurrence of severe temperature change.

A further object of the present invention is to provide an improved seal for the drum of a rotary regenerator which has improved flexibility and lower drum-seal contact pressure and wherein the pressure of the air in the regenerator chamber is used to control and give aid in controlling the contact pressure.

Other objects and advantages will become more apparent with the teaching of the principles of the invention in connection with the description and showing in the specification, claims, and drawings, in which:

FIGURE 1 is a plan view of a regenerator housing illustrating the location of various elements of the regenerator within the housing;

FIGURE 2 is a detailed horizontal sectional view of one of the seals embodying the principles of the present invention;

FIGURE 3 is a sectional view similar to FIGURE 2 and illustrating the structure of a trailing seal;

FIGURE 4 is a fragmentary enlarged detailed view illustrating a cantilever support for the seal leaves; and, FIGURE 5 is a perspective view showing a complete seal arrangement around the matrix drum for another form of trailing seal.

As shown in the drawings:

FIGURE 1 illustrates a housing 10 for a rotary regenerator embodying the principles of the present invention and adapted for use with a gas turbine. As illustrated by the broken lines the housing 10 has a partition 12 extending therethrough to divide the housing interior into chambers. At one side of the partition 12 is a high pressure low temperature chamber 14 for compressed air. At the other side of the partition is a high temperature low pressure chamber 16 to accommodate the flow of exhaust gases from the turbine.

Mounted for rotation within the housing 10 is a rotary matrix drum 18. The drum is shown as being annular in shape and rectangular in cross section so as to have flat surfaces. The drum rotates through the chambers 14 and 16 and has radial passages 23 to accommodate the flow of gas and air through the matrix drum.

Air enters the housing through the opening 15 and flows out through the opening 17. Gas flows in through the opening 19 and out through the opening 21. Opening 15 will usually be connected to a compressor discharge, opening 17 to a combustor and opening 19 to the exhaust of the turbine; but it will be understood that the regenerator may be used for other purposes. It will also be appreciated that the openings may be positioned in other locations in the housing.

For purposes of description the seal located where the matrix drum moves from the low pressure to the high pressure chamber will be called the leading seal, and where the drum passes into the low pressure chamber the trailing seal.

A leading seal assembly 20 is located where the drum 18 passes from the gas chamber 16 to the air chamber 14 to prevent the flow of high pressure air past the drum surfaces and into the chamber 16. A trailing seal assembly 22 is positioned where the drum 18 passes from the air chamber 14 to the gas chamber 16 preventing the escape of high pressure air into the gas chamber at that location. Details of the leading seal assembly 20 are particularly shown in FIGURE 2 and details of the trailing seal assembly 22 are particularly shown in FIGURE 3 and in a slightly modified form in FIGURE 5.

The matrix drum is provided with radial flow passages, such as 23, which accommodate the flow of both air and gas. While particular passages are in the gas chamber 16 they are heated by the flow of hot exhaust turbine gases and when they move to the air chamber the material of the matrix drum surrounding the passages gives up heat to the air flowing therethrough thus effecting one of the objectives of the regenerator and transferring heat and improving the overall efficiency of a turbine compressor combination. The passages may be constructed in various forms such as by rings 25 with radial corrugations stacked alternately with flat rings 27.

As illustrated in FIGURES 2 and 3, the seals have a plurality of parallel stacked highly flexible sealing leaves such as shown in stacks 24, 26, 28, and 30. In FIGURE 5 the stacks are shown at 54, 55, 56, and 57. The leaves extend toward the outer surfaces of the rotating matrix drum 18 in the direction of rotation, and as shown in FIGURE 2, leaves 24 extend toward the surface 32 and leaves 26 toward the surface 34. For the leading seal 20, the leaves 24 and 26 are unstressed and their free ends 24a and 26a are in close adjacency to the surface but not in pressed rubbing engagement therewith. When the regenerator is operating, the chamber 14 is pressurized and the pressure differential across the stacks of leaves of the leading seal will bend them in cantilever fashion against the drum surfaces into sliding sealing engagement therewith.

It will be understood that similar stacks of leaves press against the upper and lower flat surfaces of the ring and that such leaves are part of the seal 20. The arrangement is substantially as shown in FIGURE 5 which shows one form of assembly for the trailing seal 22.

The leaves 24 of the leading seal 20, are supported by a cantilever support 36 mounted on the partition 12 and the leaves 26 are mounted on the cantilever support 38. Similar supports are provided for the leaves above and below the matrix ring 18 and form a rectangular ring 29 surrounding the ring 18, similar to the ring 31 shown in FIGURE 5. The ring is then mounted in the housing, secured to the housing wall 10 such as by bolts 45 and suitably secured to the partition 12 and to the top and bottom of the housing.

The supported ends 24b and 26b of the leaves are secured such as by being provided with holes with mounting bolts 42 and 44 being threaded into the supports 36 and 38.

This arrangement is also illustrated in FIGURE 5 wherein the arrangement of sealing leaves completely surrounds the drum 18.

Clamped over the sealing leaves 24 and 26 are heat baffles 48 and 50 which comprise relatively rigid baffles or plates mounted on the cantilever supports by the supporting bolts.

As illustrated in the detailed view of FIGURE 4, in one form the leaves 24 are separated by spacers or shims 52. This improves the sliding relationship between the cantilever supported leaves. In some instances the cantilever leaves may be stacked with their faces in contact and in any event the leaves are free to slide over each other as they are deflected rather than depending on molecular resilience as would be the case with a solid cantilever seal. Because the seal is laminated a unit load will cause it to deflect considerably more, as borne out by the deflection formula for cantilever beams, which shows deflection to be directly proportional to the fourth power of the beam length and inversely proportional to the third power of the beam lamination thickness. The smaller the lamination thickness becomes, the greater number of laminations required to resist the load imposed which, of course, means a longer drum seal contact length. The more flexible the seal, the lower drum seal contact pressure becomes which means lower drag forces and wear. The various factors involved in the structural design are optimized to yield a configuration having the shortest possible beam length, the greatest number of leaves for flexibility, and offering the smaller deflection in order to keep corner leadage at a minimum where a labyrinth effect is achieved as will be described.

The trailing seal is shown in detail in different forms in FIGURES 3 and 5. This is the seal located where the drum passes from the high pressure low temperature air chamber 14 to the high temperature low pressure gas chamber 16. The seal contacts the surfaces of the rotating matrix drum 18 and is again formed of stacks of flexible sealing leaves as shown at 28 and 30 in FIGURE 3 and at 54, 55, 56, and 57 in FIGURE 5.

In FIGURE 5, the leaves 54 are mounted on the cantilever support 60 and the leaves 56 on the cantilever support 58. The supports join other supports 61 and 63 to form the rectangular ring 31 around the matrix 18. The ring is supported in the housing with the support 60 being mounted on the shell of the housing 10 by bolts which may be threaded into holes omitted from the bar 60 in FIGURE 5, for clarity. Similar bolts secure the ring to the partition 12 and top and bottom of the housing.

The stacks of seal leaves 54, 55, 56, and 57 are held to the support ring 31 by sets of bolts, 65, 67, 69, 71 as shown in FIGURE 5. Spacer shims may be used as shown in the detail drawing of FIGURE 4, if desired.

Heat baffle plates 72, 73, 74 and 75 are bolted over the seal leaves and face the high temperature chamber.

In the form of seal shown in FIGURE 3, the heat baffles are integral with the supports for the stacks of leaves. Supports 76 and 77 hold the leaves and the leaves are held by bolts 78 and 79. Backing plates 80 and 81 are beneath the bolts. The supports are joined to a ring and secured in place such as by bolts 82 which connect the seal to the housing wall.

Integral heat baffles 83 and 84 project from the supports to protect the seal leaves.

In the trailing seal 22 the leaves are preloaded, as contrasted with the leading seal. That is, the laminations are deflected and come into contact with the drum prior to operation of the regenerator and actual introduction of turbine exhaust and compressor discharge to the regenerator chambers. Upon operation of the regenerator the pressure differential between the chambers 16 and 14 acts to decrease the spring deflection of the leaves and decrease the drum seal contact force thereby reducing wear. In design, the proper balance of the various factors are taken into consideration including the strength of the flexible seal leaves and the pressure differentials will obtain the optimum contact force, reducing wear to a minimum, yet retaining an effective seal.

Thus in both the cases of the leading and trailing seal the pressure differential is used as a control of the force between the seal and the rotating matrix drum.

The leaves of the seals for the adjoining faces of the matrix, as illustrated in FIGURE 5, are positioned so as to be closely adjacent each other in sealing position and for obtaining a labyrinth seal at the corner. This effect improves the seal at the corner and reduces leakage.

In operation the matrix drum 18 is rotated through the high temperature low pressure gas chamber 16 and through the high pressure low temperature air chamber 14. As the pressures build up, the leading seal, as shown in FIGURE 2, with leaves 24 and 26, is affected by the pressure differential by the leaves being loaded against the drum surfaces 32 and 34. At the same time the pressure differential decreases the force of the preloaded leaves 28 and 30 of the trailing seal, shown in FIGURE 3 and leaves 54, 55, 56, and 57 of FIGURE 5. The pressure between the tips of the highly flexible spring seal leaves and the drum surfaces prevents the escape of gas as the drum rotates from chamber to chamber and the labyrinth effect at the edges of the leaves, as shown in FIGURE 5, prevents leakage past the corners of the matrix drum and the ends of the leaves of the seals.

Thus it will be seen that I have provided an improved sliding seal assembly for a rotary regenerator which meets the objectives and advantages hereinbefore set forth. The seal and regenerator assembly are well adapted for use with a gas turbine and the seals are improved in flexibility and sealing drum contact force thereby meeting the problems encountered by devices heretofore used.

I have, in the drawings and specification, presented a detailed disclosure of the preferred embodiments of my invention, and it is to be understood that I do not intend to limit the invention to the specific forms disclosed, but intend to cover all modifications, changes and alternative constructions and methods falling within the scope of the principles taught by my invention.

I claim as my invention:

1. A regenerator for a gas turbine or the like comprising an enclosing housing having a partition to separate a high temperature low pressure chamber from a low temperature high pressure chamber, a matrix member rotary regenerator mounted within the housing and passing through said partition into each of said chambers, leading and trailing seals between the chambers to prevent leakage from the high pressure chamber past the surfaces of the rotating matrix member regenerator, each of said seals including a plurality of flexible sealing leaves with free ends in sealing relationship with the surfaces of the rotating matrix member regenerator during operation of the regenerator, cantilever support means on the partition and housing securing the ends of the leaves remote from said free ends to hold the free end projecting toward the surfaces of the matrix member regenerator to be sealed, and a relatively rigid heat baffle member on the support means positioned between the leaves and the high temperature chamber and projecting into close proximity with the surfaces of the matrix member regenerator to prevent damage to the leaves.

2. A regenerator comprising, in combination, a rotary matrix drum having flow passages for accommodating the flow of heated gases and cool compressed air, a housing supporting the drum and having a partition with openings receiving said drum therethrough and providing separate flow chambers for the air and gases, separate seals in said openings of the partition preventing the passage of air or gases between the chambers and including at least one seal having a first plurality of stacked sealing leaves projecting toward a first surface of the drum and a second plurality of stacked sealing leaves at an angle to said first leaves and projecting toward a second surface of the drum adjoining said first surface, means on the partition for supporting the first and second plurality of leaves in cantilever fashion with the free ends of the leaves in sealing relationship respectively with the first and second surfaces of the drum during operation of the regenerator, and said leaves being so positioned that the edges of the second plurality of leaves form a labyrinth seal with the edges of the first plurality of leaves, and said means for supporting the first and second plurality of leaves holding said leaves in edge engagement during operation of the regenerator.

3. A regenerator for a gas turbine comprising a housing, a partition in said housing providing first and second chambers in the housing, said first chamber having inlet and outlet passages for accommodating the flow of low pressure high temperature gas, said second chamber having inlet and outlet passages for accommodating the flow of high pressure low temperature compressed air, a rotary matrix cylinder within the housing positioned for rotation through each of said chambers, said partition having leading and trailing openings receiving the cylinder therethrough, a leading seal positioned in the leading opening of the partition where the cylinder passes from the gas chamber to the air chamber and having a plurality of flexible stacked sealing leaves with free ends projecting toward the drum in the direction of drum rotation with said free ends spaced from the drum surface, a cantilever support on said partition mounting the leaves at the ends thereof opposite said free ends and supporting the leaves in cantilever fashion whereby the pressure differential across the leaves will flex the leaves into rubbing sealing contact with the matrix cylinder during operation of the regenerator, a trailing seal in the trailing opening of the partition where the matrix cylinder passes from the air chamber to the gas chamber and having a plurality of flexible stacked sealing leaves with free ends projecting toward the cylinder in the direction of rotation thereof and with the ends in engagement with the cylinder, and a cantilever support on said partition for the leaves of said trailing seal preloading the leaves a predetermined amount against the cylinder so that during operation of the regenerator the pressure differential across the leaves of the trailing seal will reduce the force against the cylinder.

4. A regenerator for a gas turbine or the like comprising a rotatable matrix cylinder having passages connecting the inner and outer peripheries thereof, a housing enclosing said cylinder, a partition in said housing having leading and trailing openings receiving said cylinder therethrough, said partition dividing the housing into a high temperature low pressure chamber and a low temperature high pressure chamber, a first inlet in the housing feeding high temperature gases into the low pressure chamber, a first outlet in the housing discharging gases from the low pressure chamber, a second inlet in the housing feeding low temperature gases into the high pressure chamber, a second outlet in the housing discharging gases from the high pressure chamber, leading and trailing seals enveloping said cylinder in the openings of said partition to prevent leakage from the high pressure chamber into the low pressure chamber, seal supports on the partition at said leading and trailing openings, said leading and trailing seals each having a stack of leaves with fixed ends secured to said seal supports and free ends resiliently engaging the cylinder with the free ends of the leading seal extending into said high pressure chamber and the free ends of the trailing seal extending from the high pressure chamber into the low pressure chamber, and heat baffle means on said seal supports positioned adjacent the leaves between the leaves and the high temperature chamber to minimize damage to the leaves.

References Cited in the file of this patent

UNITED STATES PATENTS

| | | |
|---|---|---|
| 1,843,252 | Toensfeldt | Feb. 2, 1932 |
| 2,476,324 | Reich | July 19, 1949 |
| 2,634,145 | Monahan | Apr. 7, 1953 |
| 2,646,818 | Bimpson | July 28, 1953 |
| 2,680,598 | Trulsson et al. | June 8, 1954 |
| 2,880,972 | Williams | Apr. 7, 1959 |
| 2,888,248 | Bubniak et al. | May 26, 1959 |

FOREIGN PATENTS

| | | |
|---|---|---|
| 477,757 | Germany | May 30, 1929 |
| 543,093 | Great Britain | Feb. 10, 1942 |
| 716,440 | Great Britain | Oct. 6, 1954 |